US006479751B1

(12) United States Patent
Bisson et al.

(10) Patent No.: US 6,479,751 B1
(45) Date of Patent: Nov. 12, 2002

(54) CONTACT DISCS FOR CONDUCTING PLATES OF BUSBARS

(75) Inventors: Didier Bisson, Doubs (FR); Philippe Guyon, Pontarlier (FR); Christian Pernot, Pontarlier (FR)

(73) Assignee: Framatome Connectors International, Courbevoie (FR)

( * ) Notice: Subject to any disclaimer, the term of this patent is extended or adjusted under 35 U.S.C. 154(b) by 0 days.

(21) Appl. No.: 09/693,208

(22) Filed: Oct. 20, 2000

(30) Foreign Application Priority Data

Oct. 21, 1999 (FR) ........................................... 99 13320

(51) Int. Cl.[7] ................................................ H02G 5/00

(52) U.S. Cl. .................. 174/70 B; 174/68.2; 174/72 B; 174/88 B; 174/99 B; 174/149 B; 439/212; 361/611; 361/650

(58) Field of Search ............................. 174/70 B, 68.2, 174/72 B, 88 B, 99 B, 149 B; 439/212; 361/611, 650

(56) References Cited

U.S. PATENT DOCUMENTS 3,784,885 A * 1/1974 Weidemann ............... 165/80.4
4,443,670 A * 4/1984 Nakamura et al. ...... 200/11 DA
5,256,502 A * 10/1993 Kump ........................ 429/150
5,262,753 A * 11/1993 Duplaix .................... 200/52 R
5,744,873 A * 4/1998 Hasegawa et al. ............. 200/4

FOREIGN PATENT DOCUMENTS

| | | | |
|---|---|---|---|
| DE | 3939429-a1 | * 6/1991 | .................. 29/622 |
| DE | 4117606-a1 | * 10/1991 | ................. 200/275 |
| DE | 4216101-c1 | * 6/1993 | |
| DE | 4228492-a1 | * 3/1994 | ............ 15/200.001 |

* cited by examiner

*Primary Examiner*—Dean A. Reichard
*Assistant Examiner*—Jinhee J Lee
(74) *Attorney, Agent, or Firm*—Perman & Green, LLP

(57) ABSTRACT

The invention relates to a contact disc (1) for a conducting plate (2) of busbars, comprising a contact surface (3) projecting upwards with respect to the surface of the conducting plate where the contact surface (3) is integral with the conducting plate (2) and where the segment-shaped slots (4*a*, 4*b* 14) are arranged all around, to make possible a deformation of the plate without a significant reduction of the surface of the contact disc provided for receiving an electronic component.

9 Claims, 3 Drawing Sheets

CONTACT DISCS FOR CONDUCTING PLATES OF BUSBARS

BACKGROUND OF THE INVENTION

The invention relates to a contact disc for conducting plates called busbars, comprising a contact surface projecting slightly upwards with respect to the surface of the conducting plates which has in its center a hole for the passage of a contact pin.

1. Field of the Invention

The invention finds application wherever it is necessary to form connections within electrical distribution systems using busbar conducting plates which are destined to come into contact with and to fix electronic power components to the said conducting plates. A particular, but non-limiting, field of application is, accordingly, that of electrical connections destined for transmitting high currents within a busbar system.

2. Brief Description of Related Developments

In the case of connections of this type, holes are cut which are destined to receive contact pins of electronic components in certain areas in the conducting plate. In the vicinity of the holes are moreover provided radial slots destined to facilitate, when the projection is formed, a deformation of the material of the conductor (generally copper) and to avoid cracks of the material of the conductor as well as excessively large variations of thickness of the material caused by stretching.

Another advantage of the radial slots resides in the fact that because of their presence, a certain elasticity of contact is achieved during the assembly of the contact pin.

A plurality of contact discs is provided on such electronic distribution systems, in order to implement galvanic connections of the electronic components to existing conductors. When the contact pins are fixed on the conducting plate, it is possible to encounter small differences of level of the contact pins with respect to the surface of the conductor. In order to compensate for these slight differences of level, the surface of the conductor is dished, in order to achieve good mechanical contact between the contact disc and the contact pin. This, however, involves a significant reduction of the contact surface at its connection with the contact pin, which generally speaking results in a higher contact resistance at the said connection. In the presence of a higher contact resistance, losses increase and announce their presence, particularly during the transmission of high intensity currents, by the fact that the contact material strongly heats up which, in turn, leads to a premature ageing of the electronic components.

SUMMARY OF THE INVENTION

This purpose is achieved according to the invention owing to the presence of a contact disc for the conducting plate of busbars which has a contact surface projecting slightly upwards and inwards with respect to the planar surface of the conducting plate, substantially parallel to and a distance above the level of the planar surface of the conducting plate and which has in its center a hole for the contact pin to pass through, whereby remarkably, the contact surface is integral with the conducting plate and where slots in the shape of segments are arranged in such a way as to make possible a deformation of the contact disc without stretching of the material from which it is made when the projection is being formed.

In a preferred embodiment, the slots in the shape of segments are uniformly distributed in order to deform on at least two concentric circles.

According to a second embodiment, the slots in the shape of segments are arranged on the contact disc in the form of a star.

According to a variant of the second embodiment, the slots in the shape of segments arranged in the form of a star have an S-shaped cross-section.

The contact disc according to the invention is formed from the conducting plate by die stamping or embossing, or any other similar operation. The extension of the material of the conductor which normally takes place during this operation is reduced to a minimum, thanks to the arrangement of the slots in the shape of segments on at least two concentric circles since these slots widen during the deformation of the contact surface. If, in order to compensate for a difference in level, a very deep contact disc is required, the slots in the shape of segments open further. The deformation of the material of the conductor takes place essentially in the zone between the contact surface and the surface of the conducting plate. In this way, the material of the conductor which surrounds the slots remains essentially intact and the contact surface also remains essentially intact even with deeper contact discs, since the deformation of the material takes place mainly in the zone between the contact surface and the surface of the conducting plate in such a way that even with deeper contact discs and deeper embossing, it is possible for higher currents to pass with smaller losses than was previously the case.

On the other hand, the purpose according to the invention can also be achieved by means of a contact disc of the aforementioned type in which the slots in the shape of segments are arranged in the form of a star. With the said star arrangement of the segment-shaped slots, the contact disc can also be formed from the contact surface by die stamping, embossing or a similar process without the material used to form the contact surface being liable to large variations of thickness. In this case a contact disc is obtained which according to the embodiment of the invention, possesses a large contact surface which protects the electronic components which are connected thereto from deteriorating with the passage of a period of time.

Moreover, the variant with segment-shaped slots arranged in the form of a star and an S-shaped cross-section, makes possible a significant increase in flexibility of the connection along all axes.

In one embodiment of the invention, the segment-shaped slots arranged on concentric circles are located between the contact surface and the conducting plate. Preferably, the slots arranged on the contact disc are laid out symmetrically with respect to an axis perpendicular to the contact surface which passes through the center of the hole through which passes a contact pin. With such a symmetrical configuration in rotation, the process of production of the contact disc can appreciably be simplified, since it is not necessary to observe any preferential orientation.

Accordingly, the hole in the centre of the contact disc makes possible the passage of a contact pin which, when it is placed on the contact disc, is able to pass through the conducting plate. Elasticity facilitates the fixing of the contact pin on the conducting plate, the contact pin which is threaded being then fixed on the lower face of the conducting plate with the help of a nut. Other advantages of the invention will be explained in greater detail with the help of appended drawings.

DETAILED DESCRIPTION OF THE PREFERRED EMBODIMENT(S)

Figure 1A:
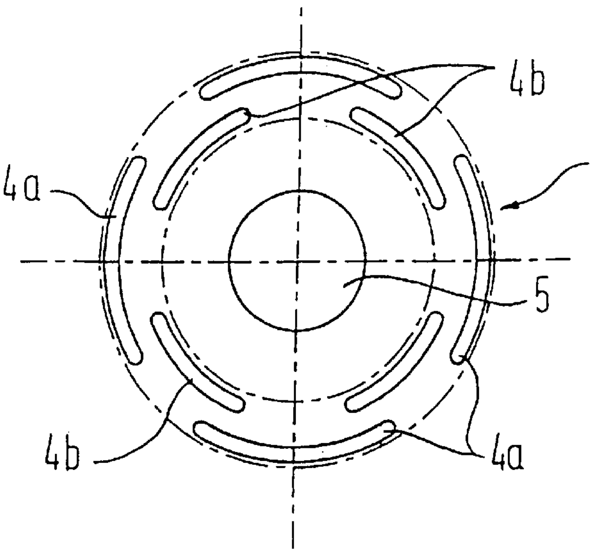
FIGS. 1*a* and 1*b* respectively show a plan view and a perspective side view of the contact disc according to the invention.
Figure 1B:
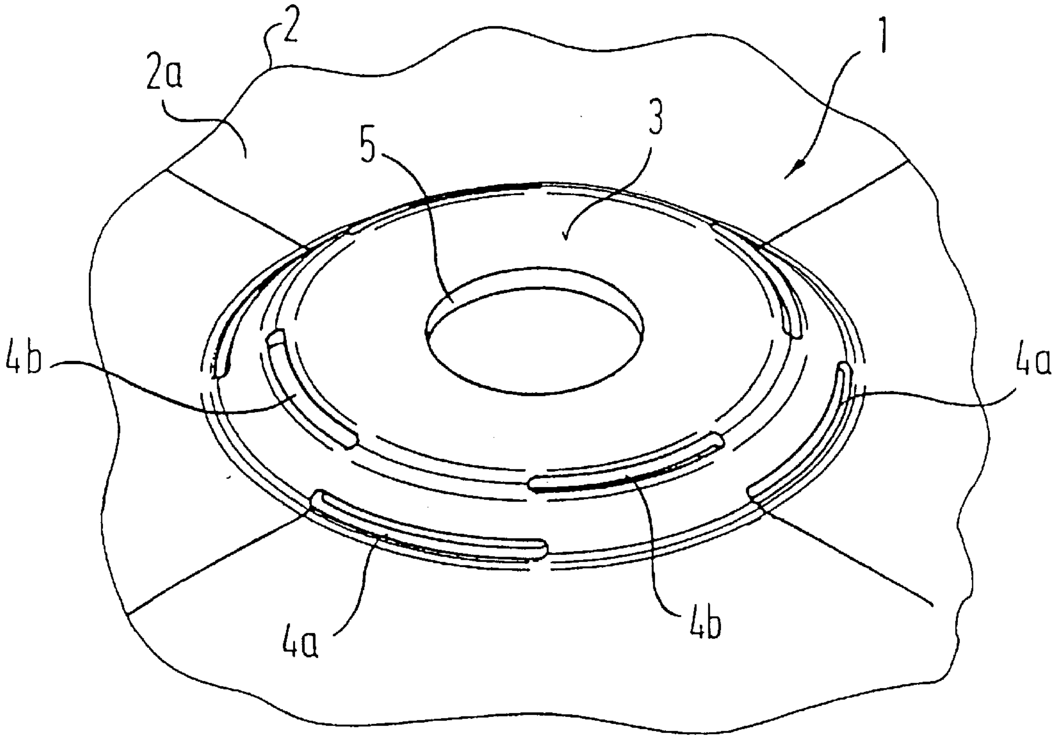

FIGS. 1*a* and 1*b* represent a contact disc 1. The segment shaped slots 4*a* and 4*b* are arranged in at least two concentric circles. The slots 4*a* and 4*b* are shown from below in FIG. 1*a* and in perspective from above in FIG. 1*b*. The contact disc 1 shown in FIG. 1 is formed from a conducting plate 2 having a planar surface 2*a* and has a contact surface 3 which in the present case extends parallel to the surface of the conducting plate. In the center of the contact disc 1 is a hole 5 to allow the passage of a contact pin of an electrical component. In the case of the contact disc shown in FIG. 1*b,* the distance between the contact surface 3 and surface 2 of the conductor is relatively small, by reason of the segment shaped slots being open only slightly. During the process of shaping, the contact surface 3 only undergoes minimal deformation. The deformation of the material of the conductor which is preferably copper, takes place principally in the zone between the two concentric circles in such a way that the contact surface remains essentially undeformed. Such an essentially undeformed surface makes possible the presentation of an optimum surface and therefore the achievement of a low contact resistance.

Figure 2A:
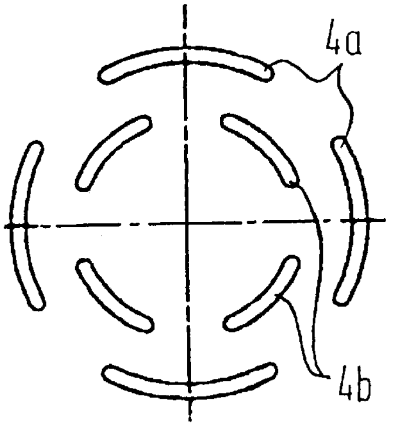
FIG. 2*a* shows a plan view of slots in the segment-shaped slots of the contact disc prior to the creation of the projecting contact surface.
Figure 2B:
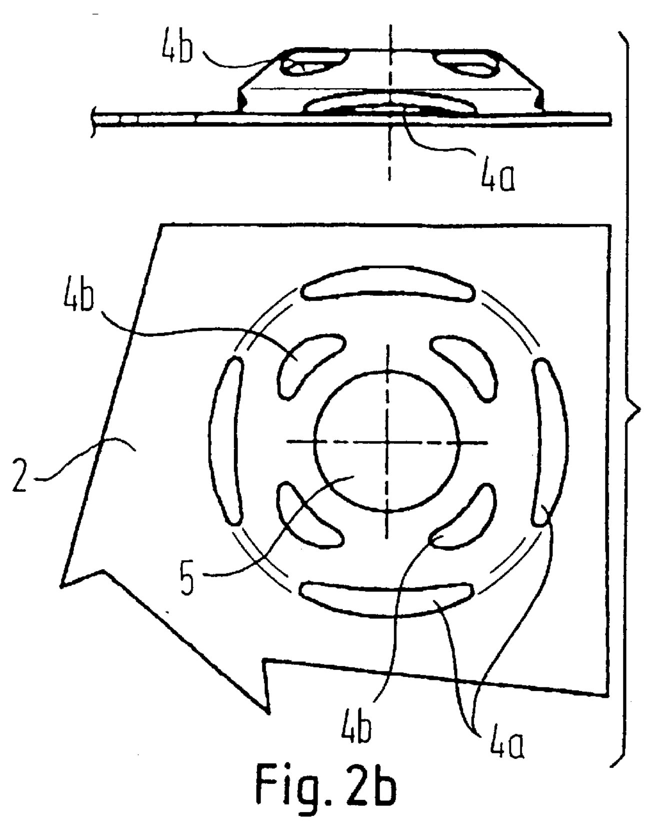
FIG. 2*b* shows a plan view of the segment-shaped slots after the creation of the projecting contact surface.
Figure 2C:
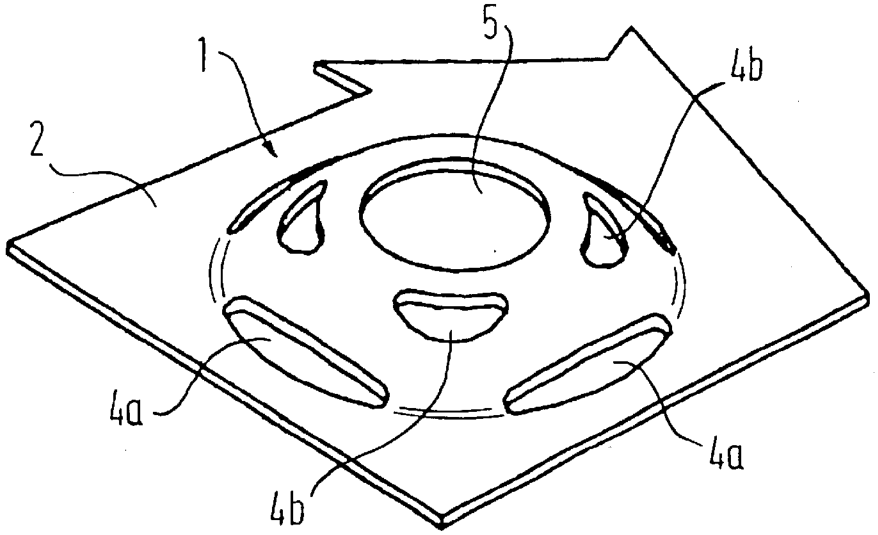
FIG. 2*c* shows a perspective view from above of the contact disc according to the invention.

In FIG. 2*a,* the segment-shaped slots 4*a,* 4*b* arranged in the two concentric circles are shown before the creation of the contact disc and hence before deformation. FIG. 2*b* shows the segment-shaped slots 4*a* and 4*b* after the surface of the conducting plate has been deformed in order to create the contact disc. As is shown in the enlargement of the slots in the shape of segments which has almost the shape of an arc of a circle, the contact surface has been moved upwards, far beyond the surface of the conducting plate 2, as is shown in FIG. 2*b* in a view from above and from the side. In FIG. 2*c,* the contact disc 1 is shown in perspective view.

Figure 3A:
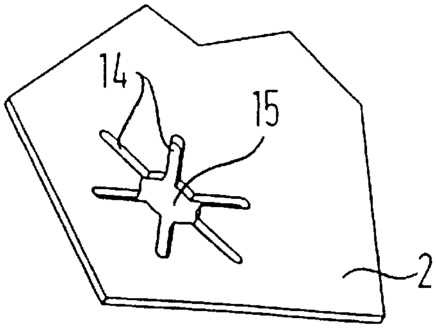
FIGS. 3*a* and 3*b* show a second embodiment example of the contact disc according to the invention, before and after the creation of the projecting contact surface
Figure 3B:
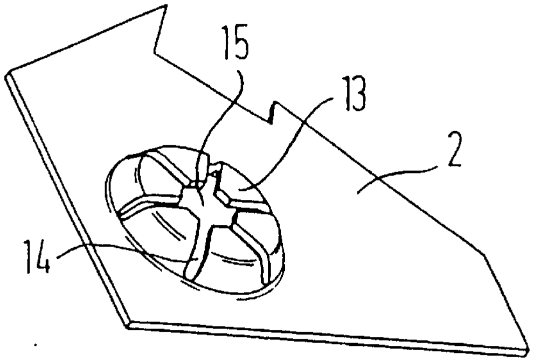
Figure 3C:
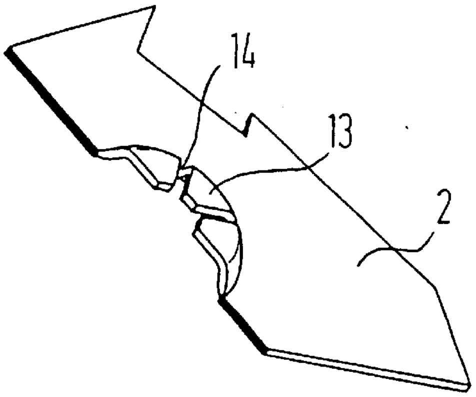
FIG. 3*c* shows a sectional view of the contact surface from FIG. 3*b;*

FIGS. 3*a* to 3*c* show another embodiment example of the invention. In the case of this embodiment example, the segment-shaped slots 14 are arranged in the form of a star. After forming the upwardly projecting contact surface 13, the hole 15 in the center widens, but the nature of the surface 13 is virtually unaffected by the shaping, that is to say, there is no cracking of the surface 13 where the thickness of the contact surface 13 corresponds to the thickness in the unshaped state, as seen in FIG. 3*a*. Preferably, three or six segment-shaped slots 14. are provided, but it is also possible to provide any other number of slots. FIG. 3*a* shows a section through FIG. 3*b*.

Figure 4A:
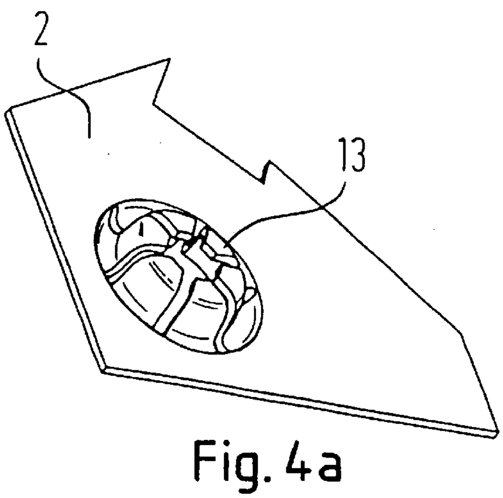
FIGS. 4*a* and 4*b* show another embodiment example of the contact disc according to the invention, illustrating a perspective elevation and a view in perspective section.
Figure 4B:
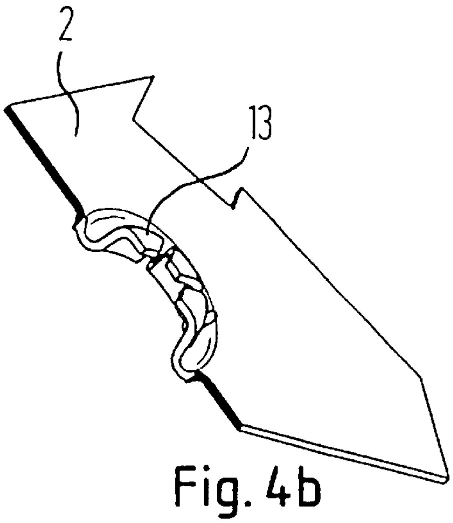

A variant of this embodiment example of the invention is illustrated in FIGS. 4*a* and 4*b*. The form of embodiment according to FIGS. 4*a* and 4*b* differs from the embodiment shown in FIGS. 3*a* and 3*b* in that the section of the connection between the contact surface 13 and the surface of the conductor 2 is curved into the shape of an S. In this way, better elasticity is achieved of the contact surface 13 in the direction of the connection and perpendicularly to the latter.

In the embodiment example illustrated in FIGS. 1 to 4, a contact disc is obtained which offers a maximum contact surface making possible the passage of high currents. Thanks to the arrangement of the segment-shaped slots, the contact surface is only slightly reduced and does not deteriorate, because, in fact, the slots only widen when the contact is being formed, the contact surface remaining optimal, which reduces the resistance of the contact in the zone of the contact disc to a minimum and thus increases the life of the contact and of the electronic components connected thereto. With the contact disc according to the invention, the differences of level between the components to be fitted on the conducting plate can wholly be compensated, since the contact surface can be shaped in a variable manner above the plate-shaped conductor. Moreover, because of the configuration of the segment-shaped slots, a certain degree of elasticity is achieved, which is important when the components are being located on the contact discs. The flexibility secured in this way also makes it possible for the busbars to withstand stresses when being fitted into systems or modules, by a correct absorption of dimensional variations linked to thermal stresses under the conditions of functioning and the environment of the systems.

Also, the contact pins can be fixed on the conductor with the help of a holding and positioning clip. In that case, the flexibility of the contact disc facilitates the fitting of a clip for fixing the contact pin.

What is claimed is:

1. A contact disc (1) for a conducting plate (2) having a planar surface and a contact surface, the contact surface which is deformed to project upwards with respect to the planar surface of the conducting plate and formed inwardly towards a center hole for a contact pin to pass through, the contact surface (3) being integral with the conducting plate (2) and projecting substantially parallel to and a distance above the level of the planar surface of the conducting plate, and having a plurality of segment-shaped slots (4*a,* 4*b,* 14) which are arranged in such a way as to make possible a deformation of the contact disc without stretching of the material from which it is formed.

2. A contact disc (1) for a conducting plate (2) according to claim 1, in which the segment-shaped slots are uniformly distributed in at least two concentric circles.

3. A contact disc (1) for a conducting plate (2) according to claim 1, in which the segment-shaped slots are radial slots arranged on the contact disc in a star pattern.

4. A contact disc (1) according to claim 3, in which the segment-shaped slots have an S-shaped cross-section.

5. A contact disc (1) according to claim 1, in which the slots on the contact disc (1) are arranged between the contact surface (3) and the planar surface of the conducting plate and symmetrically with respect to an axis perpendicular to the contact surface and passing through the center of the disc.

6. A contact disc (1) according to claim 1, in which the segment-shaped slots (4*a,* 4*b*) widen according to the distance of the contact surface (3) above the planar surface of the conducting plate.

7. A contact disc (1) according to claim 3, in which at least three segment-shaped slots are arranged in the form of the star pattern.

8. A contact disc (1) according to claim 1, in which the conducting plate (2) is made of copper.

9. A contact disc (1) according to claim 1, in which the conducting plate (2) is a busbar conducting plate.

* * * * *